Figure 1:
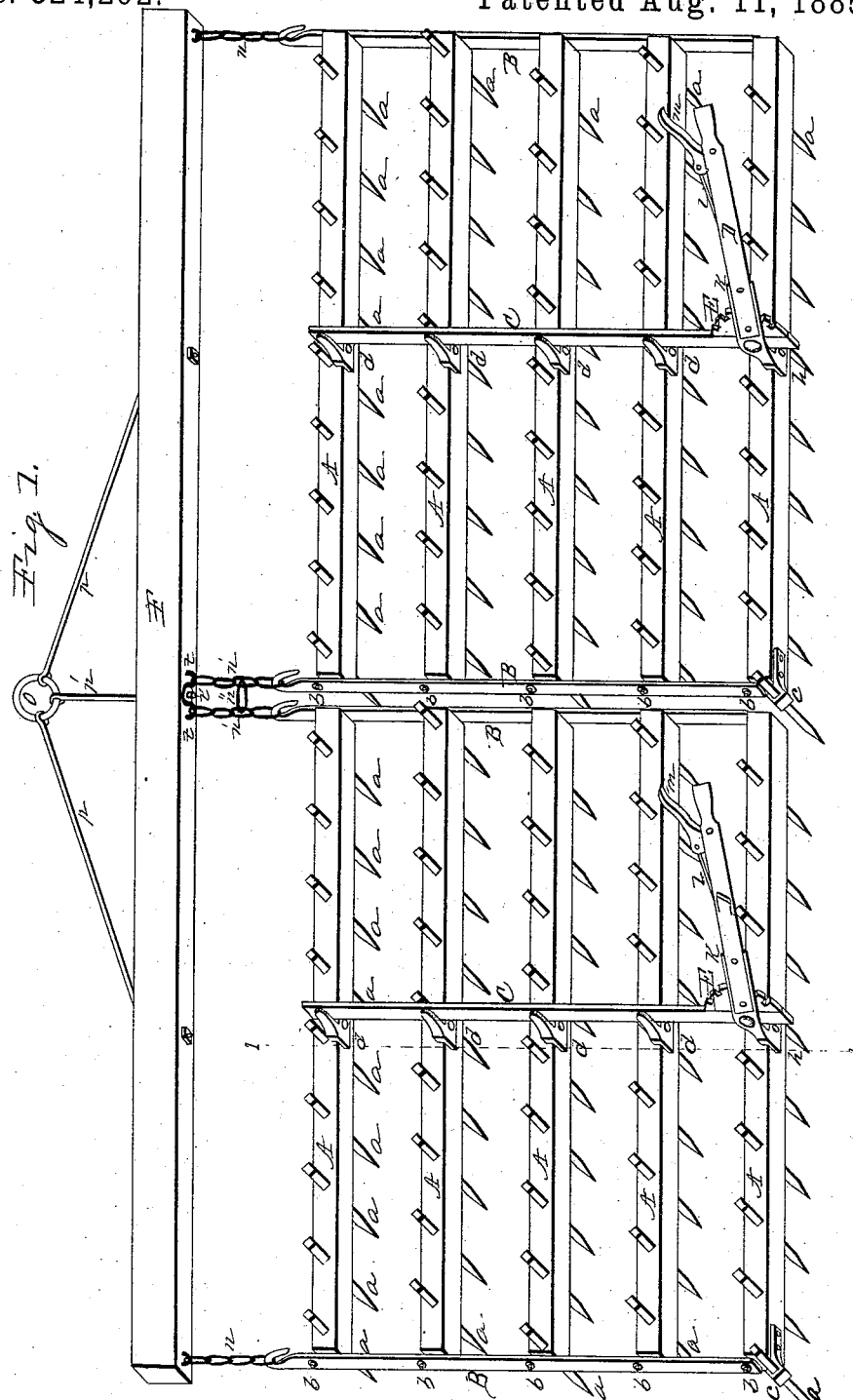

(No Model.)

2 Sheets—Sheet 1.

J. T. BIRD & R. SIMONS.
HARROW.

No. 324,292. Patented Aug. 11, 1885.

Witnesses.
Inventors.

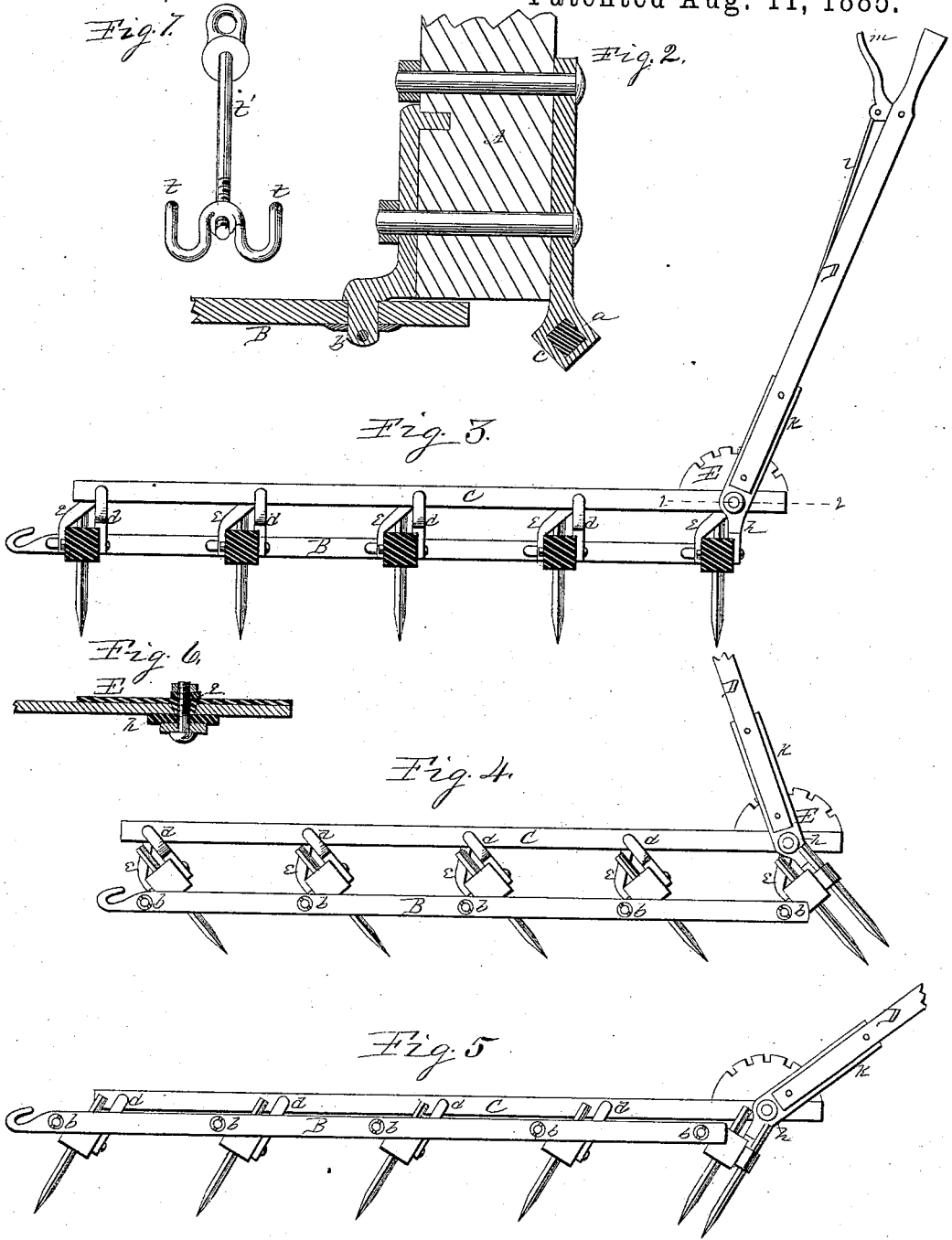

UNITED STATES PATENT OFFICE.

JOHN T. BIRD AND ROBERT SIMONS, OF ROCHELLE, ILLINOIS.

HARROW.

SPECIFICATION forming part of Letters Patent No. 324,292, dated August 11, 1885.

Application filed February 25, 1885. (No model.)

*To all whom it may concern:*

Be it known that we, JOHN T. BIRD and ROBERT SIMONS, citizens of the United States, residing at Rochelle, in the county of Ogle and State of Illinois, have invented a new and useful Harrow, of which the following is a specification.

This invention relates to a class of harrows known as the "adjustable harrow," and the object of this invention is to improve this class of harrows to render them more efficient and durable at a reduced cost. To this end we have designed and constructed the harrow represented in the accompanying drawings, in which—

Figure 1 is an isometrical representation of a harrow embodying our invention. Fig. 2 is a central horizontal section of the left-hand end portion of the rear tooth-beam. Fig. 3 is a vertical section on dotted line 1 on Fig. 1, showing the teeth in their vertical adjustment. Fig. 4 is an end elevation with teeth inclined upward. Fig. 5 is an end elevation with teeth inclined forward. Fig. 6 is a section on dotted line 2 on Fig. 3; and Fig. 7 is an isometrical representation of the eyebolt employed to connect the center draft-chains to the draft-bar.

The tooth-beams A of our improved harrow are preferably of wood, rectangular in section, and in these beams the teeth $a$, of the usual pointed form, are placed at proper intervals in the usual manner. Pivot-journals $b$, having a bracket-formed foot-plate to engage the front side of the toothed beams, are fixed in place on the ends thereof by means of suitable screw-bolts passed through the parts. The left-hand ends of the rear toothed beams are provided with a bracket tooth-support, $c$, fixed to the rear side of the beam, extending beyond its end, to support a tooth in position to divide the space between the contiguous ends of the section of the harrow. Metallic end bars, B, rectangular in section and of suitable dimensions, are provided at proper intervals with holes to receive the pivot-journals $b$. The projecting ends of the journals $b$ receive a grooved washer, and are perforated to receive a colter or holding pin passed through the journal in the groove of the washer. By this connection of the toothd beams with the end bars we produce a harrow rectangular in plan, and in which the toothed beams are held in their relative position, capable of an oscillating movement on their pivotal connection with the end bars, to vary the inclination of the teeth relatively with the line of draft. The tooth-beams A, at or near the center of their length, are fitted with brackets $d$ and $e$, fixed in place on the beams by a suitable screw-bolt passed through the foot portions of the brackets and through the tooth-beams. The upper ends of the brackets $d$ are fitted with a stud-journal which extends through holes formed for their reception in a controlling-bar, C, and through a hole in the upper end of the bracket $e$ on the opposite side of the controlling-bar, and the projecting end of the stud-journals are bored to receive a colter to fix the parts in place, as shown. The bracket-arm $h$ on the rear face of the rear tooth-beam is fitted to receive the hand-lever D, which is fixed thereto. A toothed segment, E, is fixed to the rear end of the controlling-bar C, concentric with the pivotal connection of the hand-lever with the controlling-bar. The toothed segment is provided with an axial tubular stud-journal, $s$, extending through the controlling-bar and through the hand-lever, forming its fulcrum-support, and the lever is held in place to oscillate thereon by means of a screw-bolt passed through the tubular journal.

A well-known form of spring-actuated bolt-detent is supported in a case, $k$, fixed to the hand-lever in such position thereon that the free end of the bolt-detent will engage the teeth of the segment to hold the tooth-beams in their adjusted position. The bolt-detent is connected by a link, $l$, to a thumb-lever, $m$, having a pivotal connection with the handle end portion of the hand-lever D to enable the attendant to disengage the bolt-detent from the segment to adjust the tooth-beams to regulate the inclination of the teeth. By reason of the controlling-bar connections with the several tooth-beams in the respective sections, the movement of the beams will be in unison and the inclination of the teeth will be substantially uniform throughout the section. The forward ends of the end bars, B, are produced in hook form to receive draft-links to connect them with a suitable draft-bar. In this example we have employed two sections of our improved harrow, and when so employed end links, n, and center links, n', serve to connect the hook ends of the end bars, B, with a draft-bar, F. The end links, n, are connected with the draft-bar by means of hook-bolts or staples, and the center links, n', are connected therewith by means of a double or twin hook screw-nut, t, which receive the links, and these hook ends extend into the draft-bar. A screw eyebolt, t', passed through the draft-bar enters the twin hook screw-nut and serves to fix the links in place. The center draft-links are centrally connected by means of a link, u, to limit the independent vertical and lateral movement of the sections, and permit a greater range of movement in unison both in a vertical and lateral direction. The draft-bar F is fitted with a center-draft mechanism consisting of a center draft-ring, o, and the tri-armed braces p and p', connected therewith and having a suitable eyebolt-connection of the diverging ends of the braces p with the draft-beam, and the central arm, p', is connected with the eyebolt t'. In this draft mechanism the draft-ring o connects with the evener, to which the team is attached.

Instead of the two sections connected, as shown and described, a single section may be employed for the purposes of a harrow, or more than two sections may be connected, and the sections so employed may be produced of any proper or convenient size, greater or smaller, and more or less teeth may be employed and distributed in the beams in any required or proper manner. By reason of the eccentric pivotal connection of the toothed bearing with the end bars and the adjustable mechanism the teeth are capable of a rearward inclination to such an extent that the end bars serve as runners on which to transfer the harrow from place to place.

We claim as our invention—

1. The combination, with the independent harrow-sections having the central hooked end bars, of two independent parallel chains connecting said hooked end bars with the draft-bar, and a central uniting-link for said chains, as set forth.

2. The combination, with the end bars and tooth-beams, of brackets secured to the rear sides of said tooth-beams and formed with a stud-journal to enter bearings in the controlling-bar, and separate brackets secured on the front side of the tooth-beams, extending to the opposite side of the controlling-bar and secured to the end of the stud-journal, as set forth.

3. The combination, with the end bars and tooth-beams, of brackets secured to the front sides of said beams and formed with stud-journals to enter bearings of said bars, a controlling-bar, and separate brackets securing the rear sides of the tooth-beams thereto, and an adjusting hand-lever having its lower end secured to the tooth-beam, a toothed segment, and securing-detent, as set forth.

4. The combination, with the draft-bar, and with the central connecting-links, of a twin hook screw-nut to connect the links with the draft-bar, substantially as and for the purpose set forth.

5. The combination, with the central hooked end bars of the harrow-sections, of a twin hook screw-nut and its eyebolt, a central draft link or chain, and a central draft-ring, substantially as set forth.

JOHN T. BIRD.
ROBERT SIMONS.

Witnesses:
J. O. McCONOUGHY,
H. O. ROGERS.